(12) United States Patent
Chervirala et al.

(10) Patent No.: US 9,619,830 B2
(45) Date of Patent: Apr. 11, 2017

(54) METHOD AND SYSTEM TO RECOMMEND A STARTER LIST OF APPLICATIONS FROM AN APPLICATION MARKETPLACE TO A NEW ELECTRONIC DEVICE

(71) Applicant: France Telecom, Paris (FR)

(72) Inventors: Srinivas Chervirala, Sunnyvale, CA (US); Satya Mallya, San Jose, CA (US); Wencheng Li, Santa Clara, CA (US)

(73) Assignee: FRANCE TELECOM, Paris (FR)

( * ) Notice: Subject to any disclaimer, the term of this patent is extended or adjusted under 35 U.S.C. 154(b) by 295 days.

(21) Appl. No.: 13/717,173

(22) Filed: Dec. 17, 2012

(65) Prior Publication Data

US 2013/0159134 A1   Jun. 20, 2013

Related U.S. Application Data

(60) Provisional application No. 61/576,886, filed on Dec. 16, 2011.

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/02* (2013.01)

(58) Field of Classification Search
CPC ............ G06Q 30/0631; G06Q 30/0601–30/08
USPC .................... 705/26.1–27.2; 726/2
See application file for complete search history.

(56) References Cited

U.S. PATENT DOCUMENTS

| | | |
|---|---|---|
| 2003/0032417 A1 | 2/2003 | Minear et al. |
| 2009/0193500 A1* | 7/2009 | Griffin et al. ..................... 726/2 |
| 2010/0083244 A1* | 4/2010 | Bothwell et al. ............. 717/174 |
| 2010/0250337 A1 | 9/2010 | Kassaei |

(Continued)

FOREIGN PATENT DOCUMENTS

WO   01/15449 A1   3/2001

OTHER PUBLICATIONS

Davidsson, Christoffer; Moritz, Simon, Utilizing implicit feedback and context to recommend mobile applications from first use, May 2, 2011, Association for Computing Machinery, pp. 19-22.*

(Continued)

*Primary Examiner* — Jason Dunham
*Assistant Examiner* — Brittney N Miller
(74) *Attorney, Agent, or Firm* — David D. Brush; Westman Champlin & Koehler, P.A.

(57) ABSTRACT

A method and system are provided for populating an electronic device registered for a user with applications from an application platform that the electronic device is operating with. The method is carried out by an application recommendation node. The method includes the acts of collecting a user profile for the user and an identifier for the electronic device, selecting a list of applications from the application platform based on the user profile, associating the list of applications with the identifier, receiving notification of a first presentation of the identifier following the association, and pushing the list of applications to the electronic device corresponding to the identifier following the notification.

8 Claims, 3 Drawing Sheets

(56) References Cited

U.S. PATENT DOCUMENTS

| | | |
|---|---|---|
| 2011/0307354 A1* | 12/2011 | Erman et al. ............... 705/27.1 |
| 2012/0117558 A1* | 5/2012 | Futty et al. ................. 717/176 |
| 2013/0073485 A1* | 3/2013 | Sathish et al. ................ 706/12 |
| 2013/0080251 A1* | 3/2013 | Dempski .................. 705/14.53 |

OTHER PUBLICATIONS

European Search Report and Written Opinion dated Mar. 27, 2013 from the European Patent Office for corresponding European Patent Application No. 12306566.6.

* cited by examiner

METHOD AND SYSTEM TO RECOMMEND A STARTER LIST OF APPLICATIONS FROM AN APPLICATION MARKETPLACE TO A NEW ELECTRONIC DEVICE

CROSS REFERENCE TO RELATED APPLICATION

The present application is based on and claims the benefit of U.S. provisional patent application No. 61/576,886, filed Dec. 16, 2011, the content of which is hereby incorporated by reference in its entirety.

FIELD OF THE PRESENT DISCLOSURE

The present disclosure generally relates to applications running on an electronic device and more specifically to the recommendation of such applications.

BACKGROUND OF THE PRESENT DISCLOSURE

With the success of an application market place like the Apple AppStore™, it is anticipated that Operators and Handset manufacturer will come up with application market places of their own. Application market places—app store or app platform in short—provide an opportunity to reach users more directly than the more traditional approach consisting in populating an electronic device with a ready to use set of applications. However, the exponential growth of applications available on market places creates the problem of discovery of interesting applications for most users.

A user of an electronic device, such as a mobile phone or smart phone, may to rely upon rating systems to discover the popular applications in the market place. Alternatively, recommendation systems are available, for instance as taught in US2010250337, wherein different metrics are used to evaluate the needs of a user and a selection of applications, or apps in short, are presented to the user.

Whether using ratings or recommendation engines, a user will need a great amount of time to populate his electronic device, like his mobile phone or tablet, with applications he likes and uses frequently.

Operators are trying to anticipate the needs of new users by providing any new electronic device with pre-installed applications. Nevertheless these applications are based on the operator's view of all users' needs and are not customized per user. In other words, no matter who buys a new iPhone™ or Android™ phone, the same pre-installed apps will be available to the user when he first activates his electronic device.

There is still a need today to improve the recommendation of applications when a user purchases a new electronic device. There is a further need for a novel recommendation engine that allows personalization of the applications proposed to a user an activating a new device.

SUMMARY OF THE PRESENT METHOD AND SYSTEM

An aspect of the present disclosure relates to a method for populating an electronic device registered for a user with applications from an application platform said electronic device is operating with, the method being carried out by an application recommendation node, the method comprising the acts of:

collecting a user profile for the user and an identifier for the electronic device,
selecting a list of applications from the application platform based on the user profile,
associating the list of applications with the identifier,
receiving notification of a first presentation of the identifier following the association,
pushing the list of applications to the electronic device corresponding to the identifier following the notification.

Thanks to the present method, the user of the electronic device can populate his new or upgraded electronic device automatically. There is no more need to search of relevant applications that would suit his need. The user will only need to use his device for the first time after its purchase.

The present system also related to a recommendation node for populating an electronic device registered for a user with applications from an application platform said electronic device is operating with, the recommendation node being arranged to:

collect a user profile for the user and an identifier for the electronic device,
select a plurality of applications from the application platform based on the user profile,
associate the plurality of applications with the identifier,
receive notification of a first presentation of the identifier following the association,
push the plurality of applications to the electronic device corresponding to the identifier following the notification.

The present system also relates to a telecommunication system comprising:

an application platform for downloading applications for the electronic device,
an electronic device registered to a user, and operating with the application platform,
a recommendation node for populating the electronic device with applications from the application platform, the recommendation node being arranged to:
collect a user profile for the user and an identifier for the electronic device,
select a plurality of applications from the application platform based on the user profile,
associate the plurality of applications with the identifier,
receive notification of a first presentation of the identifier following the association,
push the plurality of applications to the electronic device corresponding to the identifier following the notification.

The present system also relates to a computer program product recorded on a storage medium and executable by a computer in the form of a software agent including at least one software module setup to implement the present method for populating an electronic device with applications from an application platform.

BRIEF DESCRIPTION OF THE DRAWINGS

The present system and method are explained in further detail, and by way of example, with reference to the accompanying drawings wherein.

DETAILED DESCRIPTION OF ILLUSTRATIVE PREFERRED EMBODIMENTS

Figure 1:
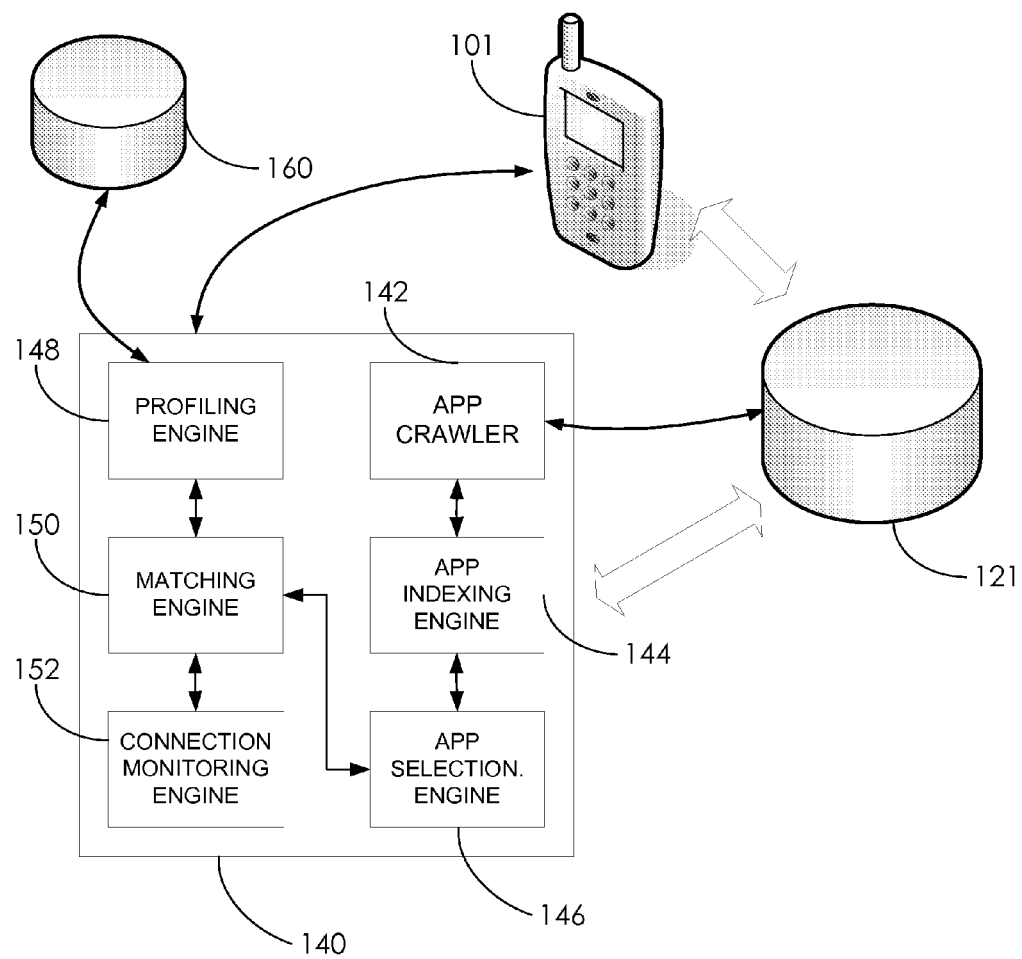
FIG. 1 shows an exemplary embodiment of the present system.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more electronic devices that enables a one and/or two-way communication path between the devices and/or portions thereof. In another example, an operative coupling may include a wired and/or wireless coupling to enable communication between an application market server, the application recommendation node of the present system and one or more user devices.

Unless specified otherwise, the exemplary embodiment here after will be described in its application to a mobile device operable to select and download via a telecommunication network applications from an application market place, also referred to here after as an app store or platform. The mobile device will also be referred to as a user or electronic device. An application market client hosted by said mobile device may be used to facilitate the selection and download of applications.

The present exemplary embodiment is in no way a limitation of the scope of the present method and system as the present teachings could be implemented for other electronic or telecommunication devices, such as computers, laptops, PDAs (Personal Digital Assistants), pads or tablets (like the iPad™ from Apple or Galaxy tablet from Samsung™), set top box and the likes. More generally any electronic device having connection means for accessing distant application market servers over a telecommunication network and downloading applications therefrom may benefit form the present teachings.

The expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the mobile device display.

In addition, it should be expressly understood that the drawings are included for illustrative purposes and do not represent the scope of the present system.

FIG. 1 shows an illustration of an exemplary embodiment of the present system. A first telecommunication device 101, illustrated as mentioned before as a mobile device, may access through a telecommunication network (not shown on FIG. 1) a first application market place—or app store— hosted by an application market server 121. The Apple AppStore™ is a known example of such an application market place. Such a server 121 may store a large number of applications that can be downloaded to the first mobile device 101 over the telecommunication network. Subsequently to its download, the user may invoke and execute the application added to his device 101. Today a large number of such applications are available and can perform tasks varying from games, location based services, call services, news, social network apps to music and video players and the likes.

A starter service node 140—or SSN—may be available in the telecom-munication network to provide an application starter package to the first mobile device 101 of the present system. This starter package comprises a customized list of applications from the app store 121 that may be of interest to the user of the device 101. This starter package—or starter list—allows the user to populate his electronic device 101 right after purchase with applications suiting his needs.

The present method may be available through an application starter service (offered by the SSN 140) that the user of the first mobile device 101 can subscribe to whenever acquiring this device 101. The present starter service node 140 acts as an application recommendation node or server in the telecommunication network and may comprise a number of parts or components as follows:

application crawlers 142 for discovering and collecting for all applications from the application market server 121 metadata describing these apps, an application indexing engine 144 that uses the application metadata collected by the application crawlers 142 to index, i.e. associate keywords, the applications across the app store 121, an application selection engine 146, that shall select applications from the app store 121, using either the indexing or the metadata gathered for the applications, based on different selection entries, a profiling engine 148 that may define a user profile for any user using the present app starter service and desiring to populate an electronic device 101 with an application starter list. Such a list of apps will match his interests as expressed in the user profile. The user profile may be based upon customer data for that user as stored in a database 160 of the telecommunication network, a matching engine 150 operatively coupled or interfaced with the application selection engine 148. The matching engine will use the user profile to define selection entries and provide them with the app selection engine 146. The app selection engine will then return a list of recommended applications that correspond to the app starter list of the present method. The matching engine will then associate the returned list of apps with the electronic device identifier, a connection monitoring engine 152 to detect first presentation of the electronic device identifier. To do so, the monitoring engine 152 may be operatively connected to a switching server (not shown in FIG. 1) of the telecommunication network that monitors mobile activities, including connection to the network. Alternatively, the monitoring engine 152 may be operatively connected to a Near Field Communication (NFC) reader, installed in a mobile device store. Upon presentation of the electronic device 101 to the NFC reader, the monitoring engine 152 will be notified of the presentation of a NFC identifier for the electronic device.

The first presentation of the identifier for the electronic device 101 will cause the push of the app starter list to the corresponding device 101 as explained here after.

One may note that the present system is illustrated with the indexing of applications available on the app store 101. The indexing is used to categorized the different applications and facilitate their matching with the user profile. As many profiling and matching techniques are readily available to the man skilled in the art, the matching may be performed directly with the application collected metadata.

Furthermore, illustrating the SSN 140 as a 6 part server is a mere illustration highlighting the different functionalities of the present SSN. This is in no way limiting as the six parts may be one of the same software or hosted on different elements of the starter service node 140. For instance the crawlers 142 may be hosted on different nodes of the present telecommunication network and may vary depending on the application market place being discovered.

Figure 2:
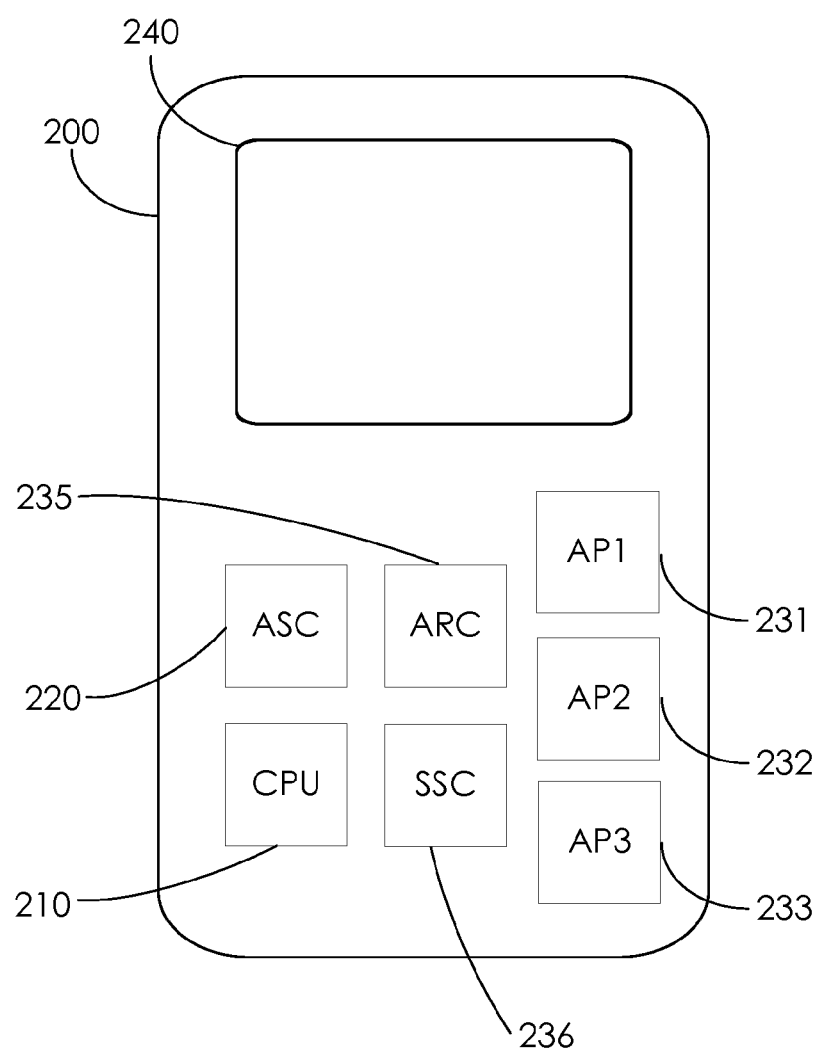
FIG. 2 shows an exemplary embodiment of an electronic device in the present system; and, FIG. 3 shows an exemplary flowchart for populating an electronic device with customized applications according to an embodiment of the present method.

FIG. 2 is an illustration of an exemplary embodiment of the user—or electronic—device used in the present system. User device 200 may be a new mobile device a user just acquired in an operator or telco store. Mobile device 200 may comprise a display 240 for presenting a Graphical User Interface (GUI) of an application program. A processor 210 (or Computational Processing Unit) is also provided for controlling and rendering the GUI presented to the display 240. The display 240 may be a touch panel. Touch panel 240 can be seen as an input device allowing interactions with a finger of a user or other devices such as a stylus. Such an input device can, for example, be used to make selections of portions of the GUI. The input received from a user's touch is sent to the processor 210 that interprets the touches in accordance with the application program (AP) corresponding to the GUI. For example, the processor 210 can initiate a task, i.e. a control of the AP, in accordance with a particular touch. More generally, processor 210 is provided for running the Operating System (OS) of the mobile device 200.

A touch panel, like display 240, or a keyboard, or keypad (not shown in FIG. 2) may also be provided to control one or more APs running on the processor 210 of mobile device 200.

An application store client 220 (ASC) may be provided for interaction with the application market place 121 of FIG. 1. Such a client, like the AppStore™ client available today on an iPhone™, will allow the user to search and browse the different applications available for download. This ASC 220 will also deal with payments for applications that necessitate such a payment prior to download. In the present illustration of FIG. 2, a number of applications, for instance AP1 231, AP2 232 and AP3 233 have been downloaded on the mobile device 200 by the user. Interactions with the GUI of an AP like API, AP2 and AP3, will participate in generating usage data that may be monitored by either a local application reader client ARC 235 shown in FIG. 2 or monitored on the network side and stored on database 160. Such data monitoring will help built and improve a user profile for the user interested in the present application starter service.

An additional starter service client SSC 236 may be provided with the user's new mobile device to obtain from the starter service node 140 the application starter list that may populate the user device 200. To do so, the SSC 236 may cooperated with the ASC 220 to download and make payments if necessary of the applications proposed in the app starter list provided by the starter service node 140.

Figure 3:
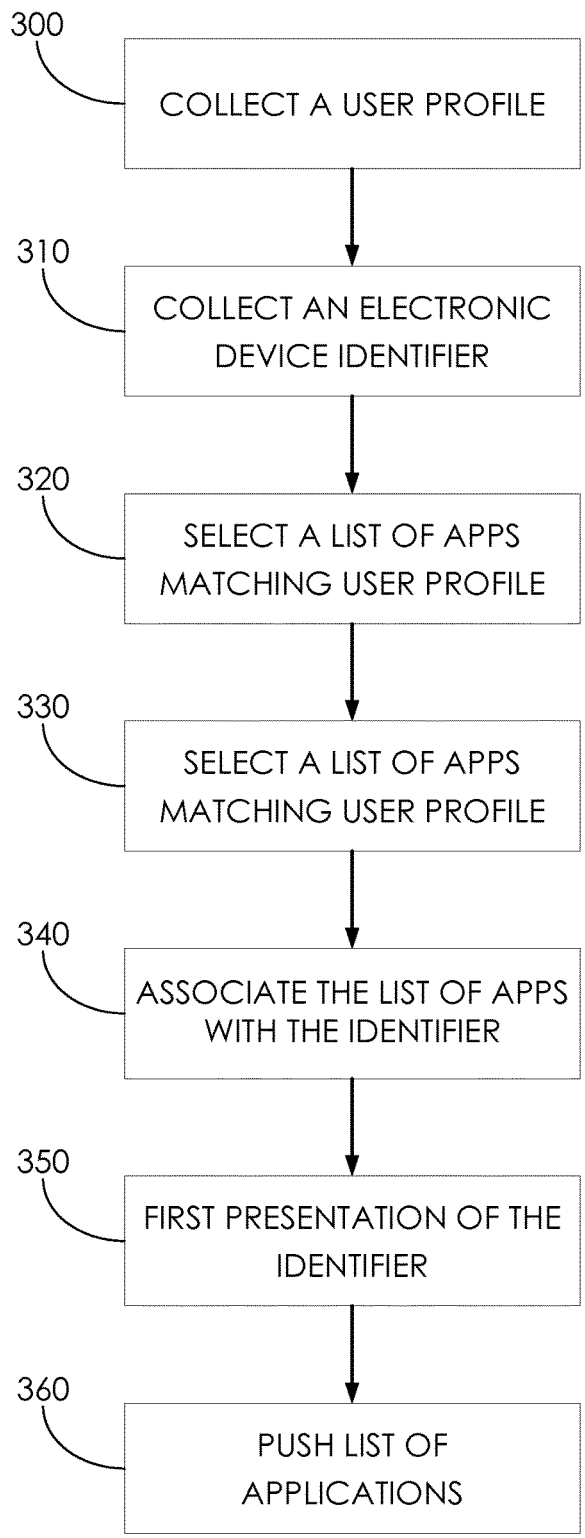

FIG. 3 is a flowchart illustrating an exemplary embodiment of the present method for populating a mobile device with a customized list of apps. This may be needed for instance when a user interested in the latest smartphones enters an operator store to purchase a new electronic device. The present method is carried out by the SSN 140 and the different engines listed in relation with FIG. 1. In a preliminary act 300, a user profile is collected for the user acquiring the new electronic device. The electronic device is operating under an app store like app store 121 of FIG. 1.

In order to collect a user profile characterizing that user, different profiling techniques are available to the man skilled in the art and are beyond the scope of the present system. The profiling may be as simple as having the user answer a few questions that will be entered by a store employee so as to be consumed by the profiling engine 148 of SSN 140. CRM data (Customer Relationship Management) for the user may be also available in the operator's network if the user is already a customer of this network. For instance his recent data consumption may be accessible through a database 160 as seen in FIG. 1 to the profiling engine 148. The data may also be available through his data consumption with other mobile devices the user is in possession of (other devices having for instance a ARC 235 as mentioned before).

Using some or all the data is available for the user, the profiling engine 148 will collect, i.e. built a user profile to characterize the user and his tastes/habits of e.g. consumption. A user for instance may consume of lot of webpages related to sports and international news, as well as watching popular series. A profile for such a user will present keywords like "sports", "tennis", "sitcoms", "international news" . . . .

Whenever a new electronic device 101 as in FIG. 1 is chosen or associated to the user, a device identifier will be collected in a further act 310 by the SSN 140. Indeed the profiling engine 148 may collect e.g. from the user/customer CRM data the phone number associated to the new device once registered to the user in the operator or telco system. The phone number will correspond to the MSISDN (Mobile Station International Subscriber Directory Number) if the device is registered in a GSM or UMTS network. Alternatively the IMSI (International Mobile Subscriber Identity) for the device, may also be used as the electronic device identifier.

Generally after the user has chosen a new electronic device 101, the store employee will scan a bar code on the electronic device box to enter in the operator system different identifiers and characteristics for the device. These characteristics become associated with the user's subscription. The characteristics may additionally comprise an NFC identifier if the electronic device is an NFC enabled device. Any of these characteristics may be used as the identifier provided they uniquely identify the electronic device. The electronic device identifier may further be enough to retrieve which app store the electronic device can operate with.

In the present system, the electronic device identifier may alternatively comprise more than just one unique identifier, e.g. it may group two or more data from the IMSI, MSISDN, NFC identifier (if available), serial number . . . . Thus the electronic device identifier may comprise the name of the app store (Apple Appstore™, Android Appstore™, Windows Appstore™ . . . ) the device can operate with. This will help the SNN 140 select from which app store the app starter list must be retrieved.

In a subsequent act 320, the SSN 140 will use the user profile to generate the list of apps that could populate the electronic device 101. This list, i.e. the app starter list, as called here before, will be generated by the matching engine 150 and the application selection engine 146 of SSN 140. Indeed the matching engine will pass on as parameters the user profile, and if needed (i.e. if the SSN 140 can handle several different app stores), the app store the electronic device 101 operates with.

Using these parameters as selection entries, the app selection engine 146 will retrieve a list of apps from the app store 121 (as known from the app store parameter) matching the user profile. This may be carried out using the app data generated by the application indexing engine 146 and the application crawlers 142 of FIG. 1. This app starter list may be seen as a plurality of apps customized to the user's interests.

In a further act 340, the selected list of apps will be associated by the matching engine 150 to the electronic device identifier. This allows the SSN 140 to have that plurality of apps ready for populating the electronic device corresponding to the identifier, whenever the user renders his new device visible in the network.

The "visibility" may come from different triggering events, like first connection to the operator's network, first presentation to an NFC reader, or first connection by the device with the app store. This may also be triggered when registering the device with an online or web application like iTunes™ from Apple. With such a first registration, the serial number of the smartphone is passed on to the app store, which causes the device to authenticate for the first time with the Apple Appstore™.

In a further act 350, the SSN 140 will be notified of the presentation of the identifier for the electronic device. This may be seen as the first presentation after the start list of application has been generated and associated to the device identifier in the previous act 340. To monitor the notification, the connection monitoring engine 152 of SSN 140 may be operatively connected to a switch of the operator network, provided the identifier is the MSISDN. Whenever the user first powers his new device, the device will authenticate for the first time with the network and a switching node in the network will detect first presentation of the MSISDN, i.e. a first network access for the device. The switching node will then be operable to notify that first presentation to the SSN 140 and its connection monitoring engine 152.

Alternatively, if the identifier is an NFC identifier, an NFC reader may be available in the store when the customer bought his new electronic device. Presenting the new device to the reader will cause the reader to detect the NCF identifier. In the present system, the NFC reader is adapted to notify the SSN 140 of the identifier presentation. Provided the connection monitoring engine 152 is notified of the NFC identifier presentation for the first time, the present method can proceed with act 360.

Using the serial number of the device as the identifier, it is the first connection and registration of the new electronic device with an app store, using for instance a web application like iTunes™ or the likes, that will be considered as the notification of first presentation. In the present system, the app store may be configured to notify the SSN 140 and its connection monitoring engine of first registration of the device with a given serial number.

In a further act 360, once the SSN 140 has been notified of the identifier presentation, the SSN 140 will push the app starter list to the electronic device for subsequent upload on the device. In other words, the notification of first presentation will be the triggering event to render the start list available to the electronic device.

The push may be over the air e.g. when the notification is reported by an NFC reader or the first network access by the new electronic device. The push may comprise the list of apps through their names or application identifier in the app store. Using this information, the starter service client 236, either automatically, or once started by the user following a notification of receipt of the starter list, will connect to the app store and start downloading the apps of the starter list.

In an additional embodiment of the present system, the push to the electronic device may comprise an indication that the applications from the starter list of apps are ready for download. The SSN will also push the starter list to the app store, in association with a user identifier for that store. Using that download indication, the starter service client 236 mentioned in relation to FIG. 2 will be executed to connect and identify the user to the app store. It will then retrieve the apps available for download and proceed with populating the electronic device with the applications from the starter list. In an additional embodiment of the present system, the user identifier may be the electronic device identifier.

Such an embodiment may facilitate prepayment of applications when the some applications from the starter list are paid applications. Indeed, the use of the present app starter service may include purchase of any paid application so that the user does not need to pay one by one the paid apps in the starter list. To do so, the starter list may be associated with a token showing that any paid applications from the starter list is already paid, the token being passed on with the push of the starter list. Using that token, and the indication for download, the starter service client will be able to download any applications from the starter list, including the paid ones, through the relevant app store.

Alternatively the push may be through the app store when the notification reported is first registration with said app store. Indeed, once the registration is notified to the user as successful, the user may see on his web application the starter list of apps. Using the example of the iTunes web application, while the smartphone is still connected to the computer hosting iTunes, the user will see a notification that new apps are available to his attention.

The push may comprise the push of the applications themselves, for instance when the SSN 140 is operatively coupled to an app store, and will instruct said app store with uploading the starter list of apps directly. The upload may be over the air, using a data connection between the app store and the electronic device. In that example, only an indication of the starter list needs to be pushed to the electronic device for instance to trigger the starter service client 236 that will cooperate with the app store for enabling the download of the apps.

The upload may also be through connection to the app store application, like connecting through iTunes™ and retrieving the starter list available in the app update section.

Finally, the above discussion is intended to be merely illustrative of the present system and should not be construed as limiting the appended claims to any particular embodiment or group of embodiments. Thus, while the present system has been described with reference to exemplary embodiments of a mobile device, it should also be appreciated that numerous modifications and alternative embodiments may be devised by those having ordinary skill in the art without departing from the broader and intended spirit and scope of the present system as set forth in the claims that follow.

Indeed the present teaching may be transposable to any electronic device capable of running an application downloaded from an application market place, such as a general purpose computer, a PDA, a pad . . . .

Furthermore, the present system has been illustrated with the example of a user purchasing a new electronic device. Populating his device with the starter list may also be useful when the user want more customized apps on his current device and signs up for the app starter service. The starter list will be available after any new presentation of the device identifier following his signing up with the service and starter list selection.

Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specifications and drawings are to be regarded in an illustrative manner and are not intended to limit the scope of the appended claims.

In interpreting the appended claims, it should be understood that:

a) the words "comprising" or "including" do not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analogue and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for populating a new electronic device with a customized application starter list of applications from an application platform that said new electronic device is operating with, the method comprising:
 collecting, via application crawlers, metadata describing each application of a plurality of applications from an application market server;
 indexing, via an application indexing engine, each application of the plurality of applications by associating keywords with each application of the plurality of applications using the collected metadata;
 collecting, via a profiling engine, a user profile of a user;
 collecting a device identifier of a new electronic device associated to the user;
 retrieving, utilizing the device identifier, a particular application platform that the new electronic device is configured to operate with;
 generating, via a matching engine, an application starter list of applications selected from the particular application platform that match the user profile using application data generated by the indexing;
 associating, via the matching engine, the application starter list with the device identifier;
 after the associating, detecting that the new electronic device is visible in a network for a first time;
 upon detecting that the new electronic device is visible in the network for the first time, pushing the application starter list to the new electronic device; and
 after the pushing of the application starter list, via a starter service client, connecting to the particular application platform and downloading the applications of the application starter list.

2. The method of claim 1, wherein the identifier comprises a Mobile Station International Subscriber Directory Number (MSISDN), and the detecting that the new electronic device is visible in the network for the first time comprises detecting that the new electronic device has been connected to the network for a first time.

3. The method of claim 1, wherein the identifier comprises a Near Field Communication (NFC) identifier, and the detecting that the new electronic device is visible in the network for the first time comprises detecting of the NFC identifier by an NFC reader for a first time following presentation of the new electronic device to the NFC reader.

4. The method of claim 1, wherein at least one application of the applications of the application starter list comprises a paid application, the method further comprising:
 associating the application starter list with a token, the pushing of the application starter list further comprising pushing the token.

5. The method of claim 1, wherein the user profile comprises the device identifier.

6. A recommendation node for populating a new electronic device with a customized application starter list of applications from an application platform that said new electronic device is operating with, the recommendation node comprising:
 a non-transitory computer-readable storage medium comprising at least one software module stored thereon; and
 a processor, wherein the at least one software module configures the recommendation node to perform the following acts when executed by the processor:
 collect, via application crawlers, metadata describing each application of a plurality of applications from an application market server;
 index, via an application indexing engine, each application of the plurality of applications by associating keywords with each application of the plurality of applications using the collected metadata;
 collect, via a profiling engine, a user profile for a user;
 collect a device identifier of a new electronic device associated to the user;
 retrieve, utilizing the device identifier, a particular application platform that the new electronic device is configured to operate with;
 generate, via a matching engine, an application starter list of applications selected from the particular application platform that match the user profile using application data generated by the indexing;

associate, via the matching engine, the application starter list with the device identifier;

after the associating, detect that the new electronic device is visible in a network for a first time;

upon detecting that the new electronic device is visible in the network for the first time, push the application starter list to the new electronic device; and after the pushing of the application starter list, via a starter service client, connect to the particular application platform and download the applications of the application starter list.

7. A telecommunication system comprising an application platform configured to download applications for electronic devices, a new electronic device configured to operate with the application platform, a recommendation node configured to populate the new electronic device with a customized application starter list of applications from the application platform, the recommendation node being configured to:

collect, via application crawlers, metadata describing each application of a plurality of applications from an application market server;

index, via an application indexing engine, each application of the plurality of applications by associating keywords with each application of the plurality of applications using the collected metadata;

collect, via a profiling engine, a user profile for a user;

collect a device identifier of a new electronic device associated to the user;

retrieve, utilizing the device identifier, a particular application platform that the new electronic device is configured to operate with;

generate, via a matching engine, an application starter list of applications selected from the particular application platform that match the user profile using application data generated by the indexing;

associate, via the matching engine, the application starter list with the device identifier;

after the associating, detect that the new electronic device is visible in a network for a first time;

upon detecting that the new electronic device is visible in the network for the first time, push the application starter list to the new electronic device; and after the pushing of the application starter list, via a starter service client, connect to the particular application platform and download the applications of the application starter list.

8. A non-transitory computer-readable storage medium comprising a computer program product recorded thereon and executable by a processor in the form of a software agent including at least one software module for populating a new electronic device with a customized application starter list of applications from an application platform that said new electronic device is operating with, when the software module is executed by the processor of a recommendation node, the method comprising the acts of:

collecting, via application crawlers, metadata describing each application of a plurality of applications from an application market server;

indexing, via an application indexing engine, each application of the plurality of applications by associating keywords with each application of the plurality of applications using the collected metadata;

collecting, via a profiling engine, a user profile for a user;

collecting a device identifier of a new electronic device associated to the user;

retrieving, utilizing the device identifier, a particular application platform that the new electronic device is configured to operate with;

generating, via a matching engine, an application starter list of applications selected from the particular application platform that match the user profile using application data generated by the indexing;

associating, via the matching engine, the application starter list with the device identifier;

after the associating, detecting that the new electronic device is visible in a network for a first time;

upon detecting that the new electronic device is visible in the network for the first time, pushing the application starter list to the new electronic device; and after the pushing of the application starter list, via a starter service client, connecting to the particular application platform and downloading the applications of the application starter list.

* * * * *